United States Patent [19]
Bradley et al.

[11] Patent Number: 5,456,045
[45] Date of Patent: Oct. 10, 1995

[54] LAWN EDGING STRIP

[75] Inventors: Douglas R. Bradley, University Park; James G. Layton, Jr., Richardson, both of Tex.

[73] Assignee: Emerld Products, Inc., Dallas, Tex.

[21] Appl. No.: 149,478

[22] Filed: Nov. 9, 1993

[51] Int. Cl.⁶ ..................................................... A01G 1/08
[52] U.S. Cl. .................. 47/33; 52/102; 52/169.3
[58] Field of Search ................... 47/33; 52/102, 52/103, 630, 169.1, 169.2, 169.3, 169.4, 309.1; 404/7, 8

[56] References Cited

U.S. PATENT DOCUMENTS

| | | |
|---|---|---|
| 276,494 | 11/1984 | Novak et al. . |
| 3,487,600 | 1/1970 | Greene ........................................ 52/102 |
| 3,701,477 | 10/1972 | Matt et al. . |
| 3,788,001 | 1/1974 | Balfanz, Jr. . |
| 4,644,685 | 2/1987 | Tisbo et al. ................................. 47/33 |
| 4,858,379 | 8/1989 | West ............................................ 47/33 |
| 5,020,272 | 6/1991 | Herrema et al. . |
| 5,117,583 | 6/1992 | Reum . |
| 5,121,569 | 6/1992 | Thomas . |

FOREIGN PATENT DOCUMENTS

| | | | |
|---|---|---|---|
| 2945292 | 5/1981 | Germany .................................... 47/33 |
| 3837815 | 12/1989 | Germany .................................... 47/33 |

*Primary Examiner*—Lanna Mai
*Attorney, Agent, or Firm*—Richards, Medlock & Andrews

[57] ABSTRACT

A lawn edging device is provided in the form of a strip having a top edge configured for withstanding hammering, a bottom edge configured for penetration into the ground, and ends constructed for interlocking with adjacent strips. A plurality of ribs spaced parallel to each other extend from both sides of the strip and are oriented perpendicular to the length of the strip to provide vertical rigidity to the strip. The ribs taper towards the bottom edge of the strip and facilitate the penetration of the strip into the ground.

26 Claims, 5 Drawing Sheets

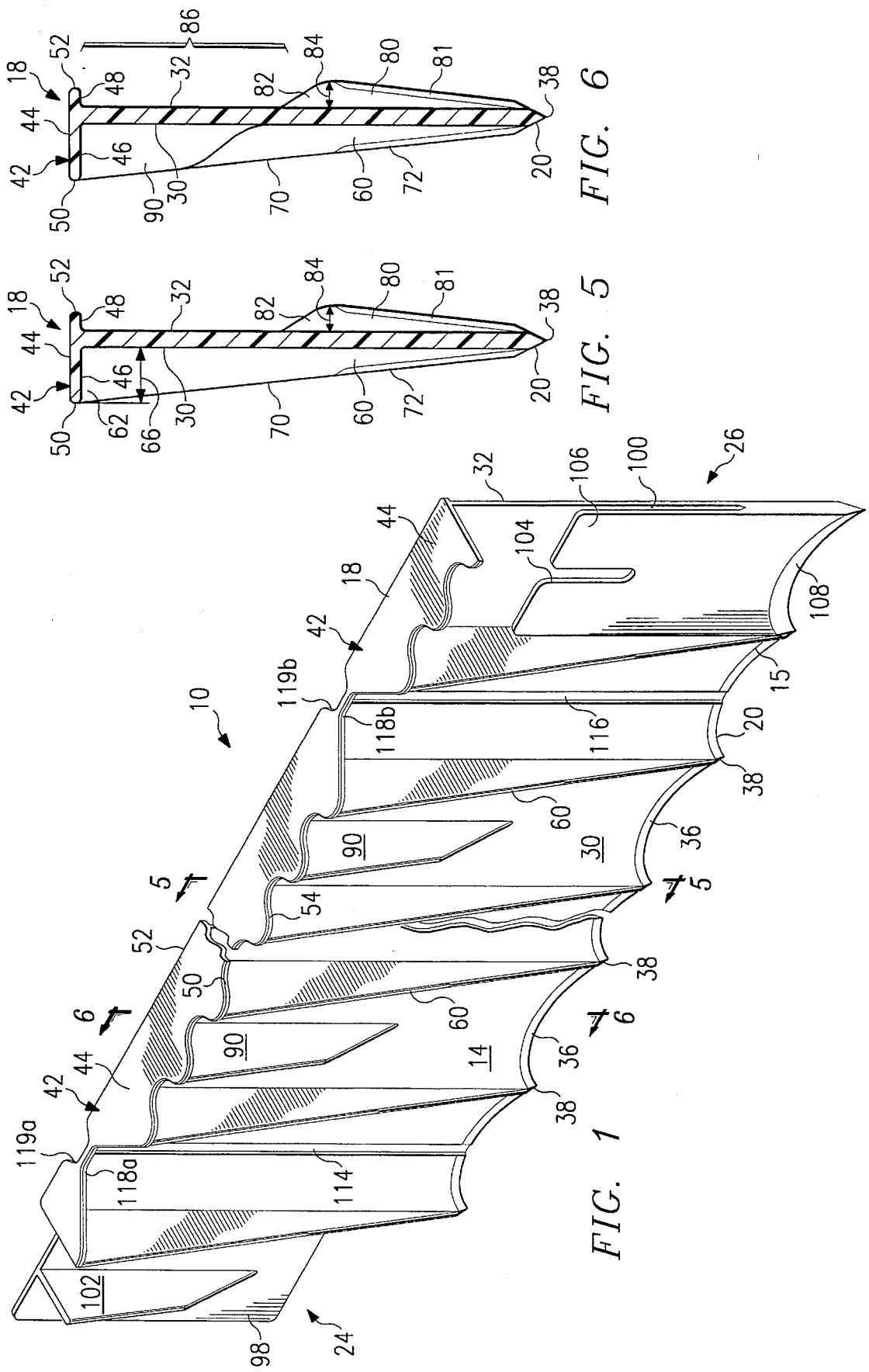

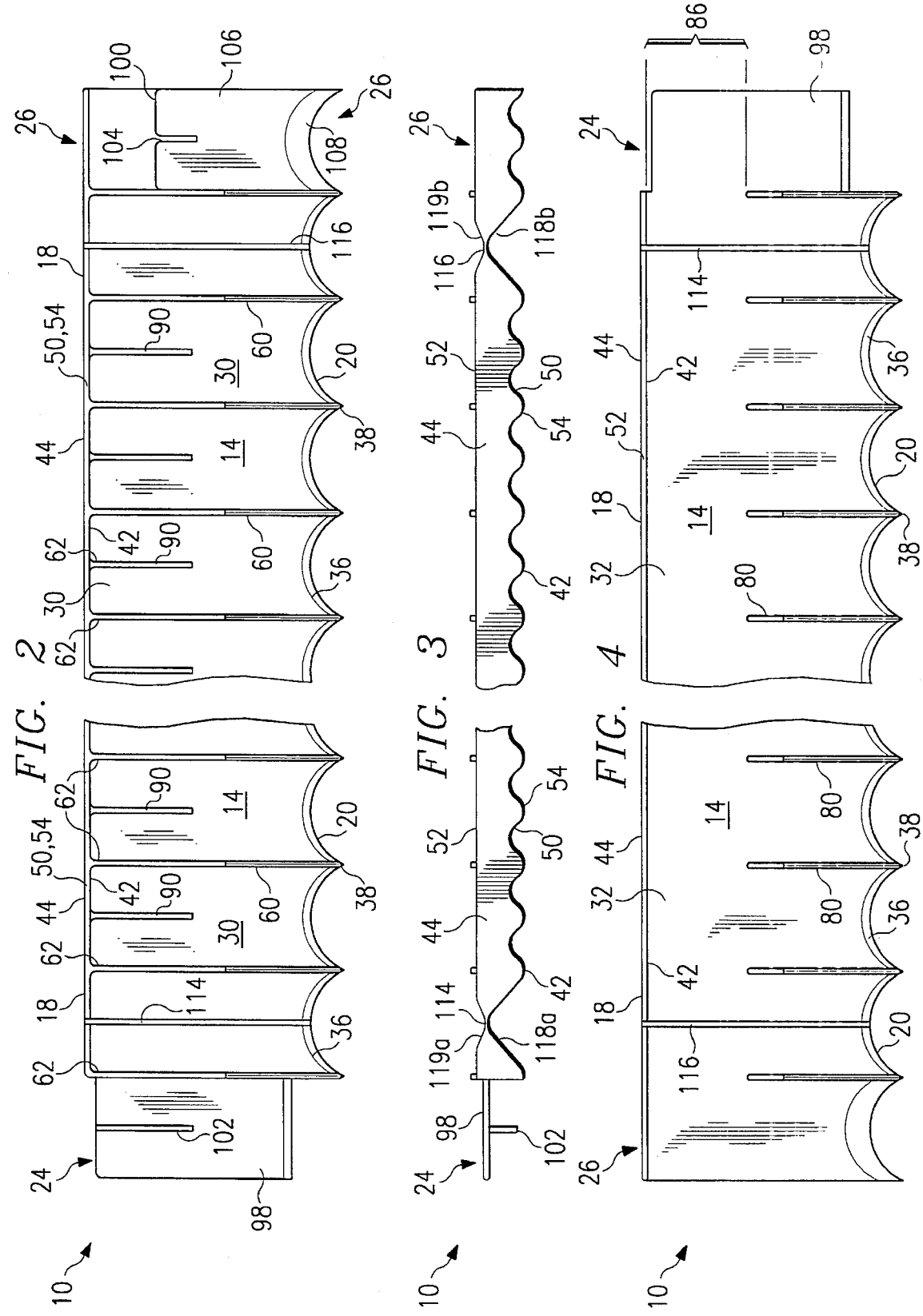

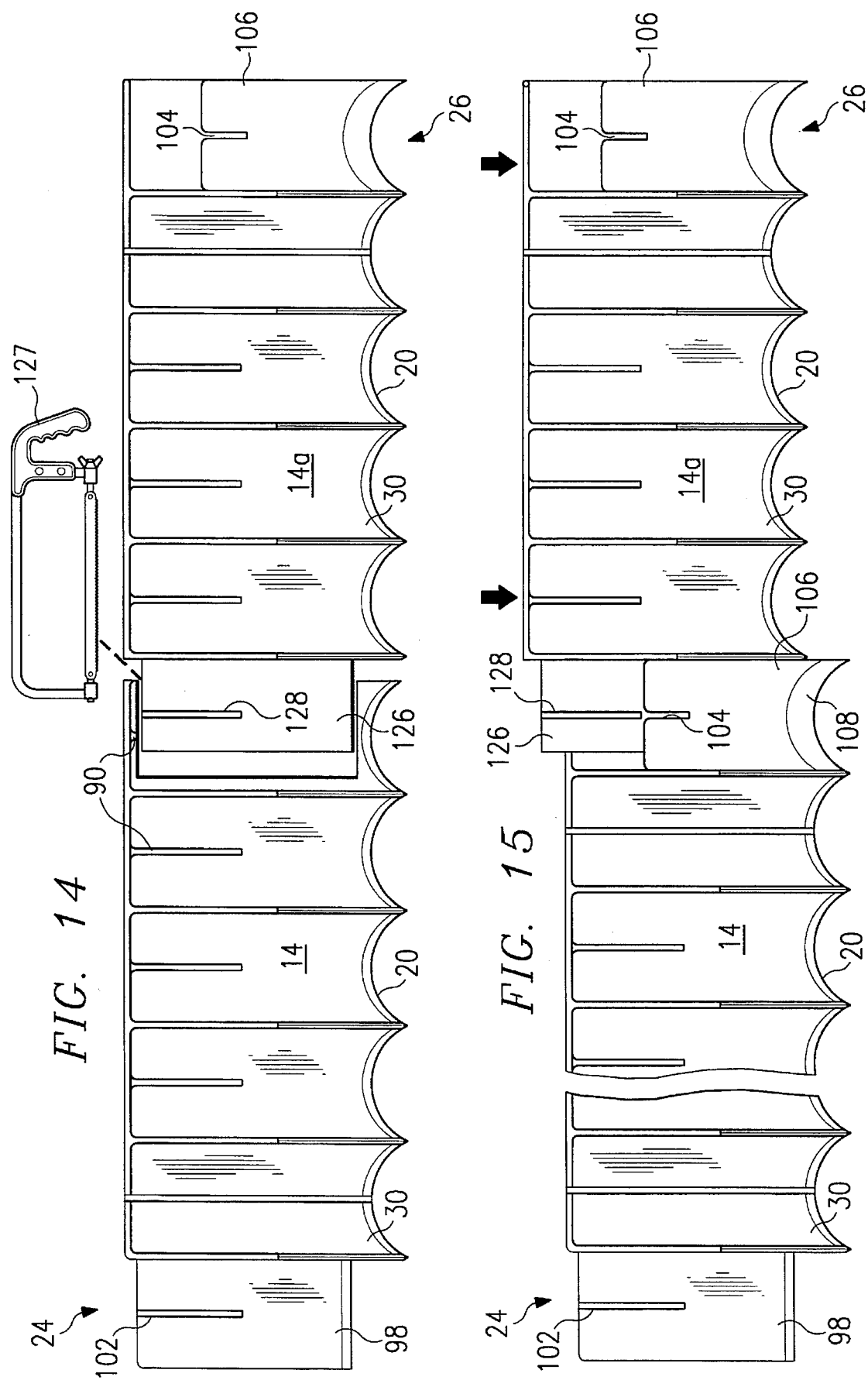

5,456,045

LAWN EDGING STRIP

TECHNICAL FIELD OF THE INVENTION

The present invention relates to a lawn edging strip for creating borders around gardens, flower beds, trees and the like, and more particularly to a lawn edging strip that does not require separate stakes and/or trenching for placement in the ground.

BACKGROUND OF THE INVENTION

Lawn edging devices used to create grass-impenetrable borders around gardens, flower beds, trees and the like typically fall into one of two groups. One group consists of edging that requires a trench to be excavated along the desired layout of the edging. Examples of such edging include brick, concrete blocks, flexible plastic edging strips, and wood. Once the edging is placed in the trench, the trench is back filled along the edging. As can be appreciated, the task of trenching and back filling is a time consuming and arduous task. Furthermore, achieving a straight line across the top of the edging as well as a constant vertical alignment of the edging while back filling the trench is cumbersome and requires precise trenching and backfilling.

The second group of edging consists of rigid metal edging that can be driven directly into the ground without trenching. However, there are drawbacks with metal edging. First, metal edging is typically painted and the paint chips and flakes over time. This and rusting of the metal edging affects the aesthetics of the edging. Also, the edges of the metal edging are typically narrow enough to pose a significant safety hazard. Children playing in the yard or people performing yard work around the edging run the risk of stepping or stumbling against the edging and being cut by the metal edges. Also, installation of metal edging is cumbersome in that separate stakes are required that are positioned along the edging and hammered into the ground to force the edging into the ground. These separate stakes are an additional safety hazard because the top of the stake may rise above the top of the edging and pose an additional risk of snagging or cutting a person.

Plastic edging devices intended to replace metal edging, for example flexible black edging that can be bought in rolls, is safer, however, such edging still requires trenching as discussed above and stakes to secure the black plastic edging in place.

Therefore, a need exists for a lawn edging device that overcomes the drawbacks of the two general types of existing edging. Specifically there is a need for edging that can be inserted into the ground without the need for trenching or stakes while at the same time being rust free, of uniform color and safe. Furthermore, a need exists for such an edging device that can be inserted into the ground in proper vertical alignment. Additionally, such an edging device should be rigid enough to withstand hammering of the edging into the ground yet be flexible enough in a horizontal direction to allow for curving of the edging.

Another limitation of conventional edging devices is the lack of versatility due to the inability to readily create sharp corners in the edging while still maintaining the aesthetic continuity of the top of the edging. Therefore, a further need exists for an edging device that can be used to create sharp corners.

Additionally, while some edging devices provide connections between adjacent sections of edging, and other edging devices can be cut to a shorter length, edging devices cannot be shortened and still provide two ends for connection to adjacent sections of edging. Therefore, a further need exists for an edging device that can be shortened as desired yet still have two ends for connection to adjacent sections of edging.

SUMMARY OF THE INVENTION

The present invention provides a lawn edging strip that can be inserted into the ground without trenching and that can be readily inserted in proper vertical alignment. Furthermore, the lawn edging device of the present invention can be used to create sharp corners and can be shortened to a desired length while still having two connectable ends.

In one aspect, the lawn edging strip of the present invention comprises a flexible strip adapted for insertion into the ground. The strip has a height defined between a top edge and a bottom edge, a length defined from a first end to a second end, and a thickness defined between a first face and a second face. The bottom edge of the strip is configured such that the bottom edge can penetrate the ground when the bottom edge is forced against the ground. The top edge is constructed to withstand hammering.

A first plurality of generally parallel ribs are spaced along and extending from the first face. The ribs are oriented generally perpendicular to the length of the strip.

A further aspect of the present invention comprises such a strip with the bottom edge contoured as a series of arches and corresponding apexes and the first ribs are aligned with the apexes to create a stake-like portion that facilitates penetration of the strip into the ground and guides the strip in proper vertical alignment. Further, the top edge is configured with a flange that is perpendicular to the strip and that has a scalloped edge to allow horizontal flexibility while still providing a surface that can withstand hammering. A further aspect of the present invention comprises such a strip with a second plurality of ribs extending from the second face and aligned with the apexes.

Yet a further aspect of the present invention comprises such a strip with living hinges spaced from each end that run perpendicular to the length of the strip and allow the ends of the strip to be turned at a sharp angle in either direction with respect to the remainder of the strip. In yet a further aspect, the strip comprises a tongue and groove construction of its ends to allow connection of a tongue end into a groove end in a vertical direction, or from the top, as opposed to requiring a side entry which would encumber the connection process of multiple strips during placement in the ground.

An additional aspect comprises the strip with extension pieces that attach to the end of the apex and rib construction to define a long stake-like extension beyond the bottom edge of the strip. A further aspect comprises the strip with stakes that have top ends for abutting underneath the flange of the strip and pointed bottom ends extending beyond the bottom edge of the strip. These two embodiments allow use of the strip in applications where there is a loose material such as mulch or peat moss on the ground and it is necessary for the strip to penetrate firm ground below the soft material to maintain any curve of the strip.

BRIEF DESCRIPTION OF THE DRAWINGS

For a more complete understanding of the present invention, and for further details and advantages thereof, reference is now made to the following description taken in conjunction with the accompanying drawings, in which:

FIG. 1 is a perspective view of the preferred embodiment of the present invention;

FIG. 2 is a front elevation of the preferred embodiment of the present invention;

FIG. 3 is a top view of the preferred embodiment of the present invention;

FIG. 4 is a back elevation of the preferred embodiment of the present invention;

FIG. 5 is a vertical cross-sectional view along line 5—5 in FIG. 1;

FIG. 6 is a vertical cross-sectional view along line 6—6 in FIG. 1;

FIG. 14 is an elevation view of a strip of the present invention being cut to a shorter length;

FIG. 15 is an elevation view of two strips being connected end to end;

DETAILED DESCRIPTION OF THE PREFERRED EMBODIMENTS

Figure 7:
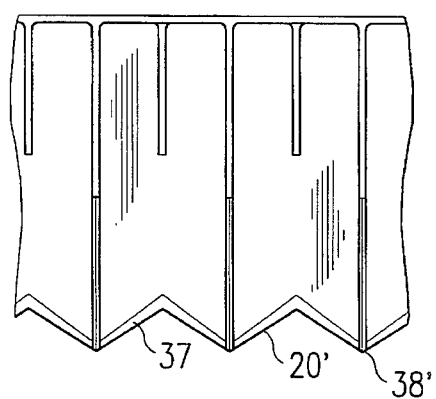
FIG. 7 is an alternative embodiment of the contour for the bottom edge of the strip.

With reference to FIGS. 1–6, the preferred embodiment of edging strip 10 of the present invention is shown. Edging strip 10 is adapted for forced insertion into the ground to create borders around gardens, flower beds, trees and the like. Edging strip 10 comprises flexible strip 14 which is preferably made of a high density polyethylene or polypropylene.

Flexible strip 14 has a height defined between top edge 18 and bottom edge 20, a length defined from first end 24 to second end 26, and a thickness defined between first face 30 and second face 32.

Figure 8:
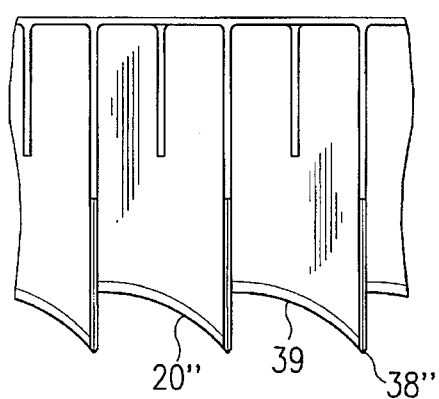
FIG. 8 is an alternative embodiment of the contour for the bottom edge of the strip.

Bottom edge 20 is preferably of a variable contour comprising a series of arches 36 and corresponding apexes 38. Apexes 38 facilitate initial positioning and insertion of bottom edge 20 into the ground. Furthermore, the thickness of strip 14 has taper 15 at bottom edge 20 to further facilitate insertion of bottom edge 20 into the ground. Bottom edge 20 may have any alternative contour that allows for insertion of bottom edge 20 into the ground. For example, FIG. 7 shows bottom edge 20' contoured in a sawtooth pattern to define a series of apexes 38' and corresponding V-notches 37. FIG. 8 shows bottom edge 20" contoured in a series of alternating half arches 39 and apexes 38".

Top edge 18 comprises flange 42 extending perpendicular to strip 14 such that top edge 18 has a T-shaped cross-section. Flange 42 defines top surface 44, first underside 46, second underside 48, first edge 50, and second edge 52. The configuration of flange 42 can be varied to achieve the desired aesthetics. In the preferred embodiment, top surface 44 is flat, first edge 50 is scalloped, and second edge is straight. Scalloped edge 54 provides greater flexibility of top edge 18 to allow curving of strip 14 prior to insertion into the ground. Top surface 44 is sufficiently wide to withstand hammering.

Figure 9:
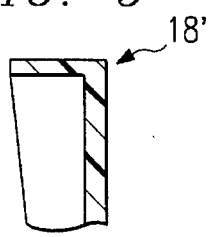
FIG. 9 is an alternative embodiment of the cross-section of the top edge of the strip.
Figure 10:
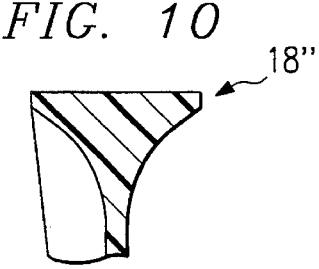
FIG. 10 is an alternative embodiment of the cross-section of the top edge of the strip.

It should be appreciated that any of a variety of top edge 18 configurations may be used. For example, FIGS. 9 and 10 show some alternative configurations of top edge 18. FIG. 9 shows top edge 18' with an L-shaped cross-section. FIG. 10 shows top edge 18" with a more triangular cross-section.

Strip 14 further comprises first plurality of ribs 60. First ribs 60 are spaced generally parallel to each other, extend from first face 30 of strip 14, and are oriented generally perpendicular to the length of strip 14. First ribs 60 are aligned with and taper toward apexes 38. First ribs 60 have top end 62 joined with first underside 46 of flange 42. First ribs 60 have first width 66 at top end 62 and a generally constant rate of taper from first width 66 to corresponding apex 38. First ribs 60 also have edge 70 which has cutting portion 72 extending from a midpoint along edge 70 to apex 38. Cutting portion 72 is sharpened in a plane perpendicular to first face 30 and facilitates the insertion of strip 14 into the ground. First ribs 60 may be of any length, profile and cross-section as long as they provide sufficient rigidity and allow insertion of strip 14 into the ground.

The combination of the configuration of first ribs 60 and apexes 38 define a series of stake-like portions along strip 14. Driving of strip 14 into the ground can be achieved by hammering along top surface 44 of top edge 18. The web-like support provided by first ribs 60 between flange 42 and strip 14 provides sufficient rigidity in a vertical direction to allow hammering of strip 14 into the ground while at the same time, scalloped edge 54 of first edge 50 and the thickness of strip 14 allow for flexibility in the horizontal direction to allow curving of the strip.

The preferred embodiment of strip 14 also comprises a second plurality of ribs 80. Second ribs 80 extend from second face 32, are spaced generally parallel to each other and are aligned with apexes 38. Second ribs 80 have a top end 82 with width 84 at a midpoint on second face 32 that tapers to corresponding apex 38. Second ribs 80 further contribute to the creation of stake-like portions along strip 14. Second ribs 80 also have sharpened edges 81 to facilitate insertion of strip 14 into the ground. It is preferred that second ribs 80 not extend completely to top edge 18 so that smooth surface zone 86 is present along the top of second face 32. Smooth surface zone 86 provides the needed smooth surface for proper flexible line trimming of grass that is along and against second face 32 of strip 14. Additionally, smooth surface zone 86 provides for a neat, aesthetic appearance. Alternatively, second ribs 80 may be of any length, profile and cross-section as long as they do not impede insertion of strip 14 into the ground.

Figure 11:
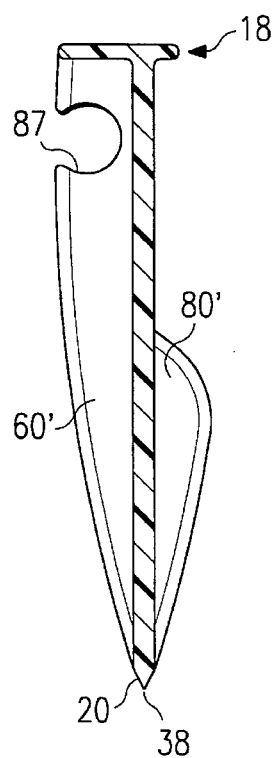
FIG. 11 is a profile of an alternative embodiment of the ribs of the strip.
Figure 12:
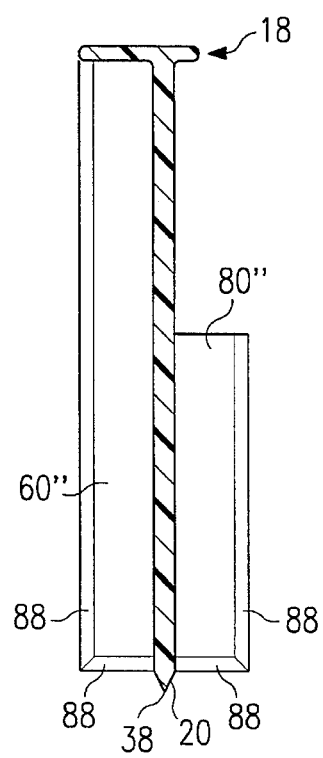
FIG. 12 is a profile of an alternative embodiment of the ribs of the strip.
Figure 13:
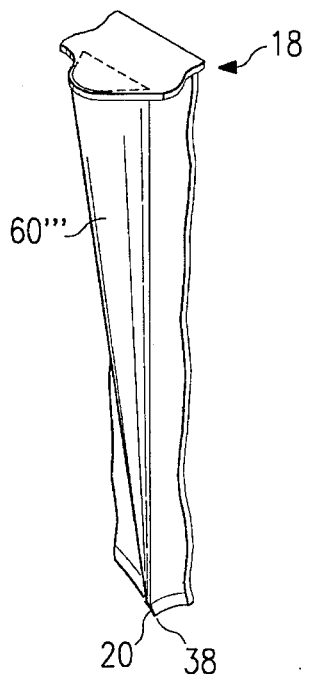
FIG. 13 is a perspective view of an alternative embodiment of a rib of the strip.

FIGS. 11–13 illustrate alternative embodiments for the first ribs and the second ribs. In FIG. 11, first rib 60' and second rib 80' have curved profiles with sharpened edges. Additionally, first rib 80' has cut-out 87 which is dimensioned to receive drip irrigation tubing or electrical wiring.

With cut-out 87 on one or more first ribs 60 per strip 14, tubing or wiring can be easily routed along the edging strip and concealed out of the way. In FIG. 12, first rib 60" and second rib 80" have rectilinear profiles with sharpened edges 88 to facilitate insertion of the ribs into the ground. FIG. 13 illustrates an alternative embodiment of a first rib. First rib 60''' is of a three-dimensional half-cone structure which provides mass and rigidity to facilitate driving of strip 14 into the ground. These figures illustrate the vast variety of configurations that the ribs can have.

Strip 14 also comprises a plurality of top support ribs 90 extending from first face 30 and first underside 46. Top support ribs 90 provide vertical rigidity to prevent strip 14 from bowing during hammering. Top support ribs 90 are spaced between first ribs 60.

The present invention has up to now been described with reference to a single strip 14. However, the present invention further comprises connections at each end such that several strips 14 can be connected to each other to create a lawn edging strip as long as desired and in any shape as desired. First end 24 of strip 14 comprises tongue 98 and second end 26 comprises groove 100 such that the tongue of the first end of one strip can be inserted, from the top, into the groove of the second end of another strip to connect the two strips together. By being able to insert tongue 98 vertically down into groove 100, the strips of the present invention can be readily inserted into the ground one by one. Specifically, once a first strip is hammered into the ground, the second strip can be positioned so that its tongue is directly over the groove of the first strip and then hammered directly into the ground. If the connection between the strips could only be achieved by a lateral entry, strip by strip installation would be cumbersome.

Tongue 98 further comprises protrusion 102 which interlocks with notch 104 in groove 100. Groove 100 is defined between flap 106 and first face 30 at second end 26. Flap 106 is attached to strip 14 along at least its bottom edge 108. Notch 104 is created in flap 106. Flap 106 is flexible to allow passage of protrusion 102 between flap 106 and first face 30 until protrusion 102 engages with notch 104. Second end 26 has flange 42 extending over flap 106 so that the connection is aesthetically concealed to give the appearance of a continuous lawn edge. The extended portion of flange 42 also prevents tongue 98 from raising up once tongue 98 is pressed into groove 100. It should be appreciated that a variety of configuration of connecting structures can be used in the present invention as long as the connection does not interfere with the insertion of a series of strips 14 into the ground and preferably allows connection in a vertical direction.

The present invention further comprises first vertical living hinge 114 spaced from first end 24 and second vertical living hinge 116 spaced from second end 26. Hinges 114 and 116 extend from top edge 18 to bottom edge 20. Flange 42 defines cut-outs 118a and b at hinges 114 and 116, respectively, to allow freedom of movement of hinges 114 and 116 in one direction, and cut-outs 119a and b on the opposite side of cut-outs 118a and b, respectively, to allow freedom of movement of hinges 114 and 116 in the other direction. Hinges 114 and 116 and cut-outs 118a and b and 119a and b allow first end 24 and second end 26 to be turned in either direction with respect to strip 14. Such turns provide for great versatility in the layout of the lawn edging strip including the ability to create sharp corners. Almost any desired corner can be achieved by turning an end of the strip and then connecting another strip 14 to the turned end.

With reference to FIG. 14 the versatility of the present invention is further illustrated. Strip 14 may be cut by a cutting implement 127 any distance from tongue 98 in such a way to shorten the length of strip 14 and create shortened strip 14a with second tongue 126. Additionally, when strip 14 is cut in such a way, one of the top support ribs 90 becomes second protrusion 128 on shortened rib 14a. The new tongue 126 and protrusion 128 structure can then be inserted into groove 100 of another strip 14 and engage notch 104.

FIG. 15 illustrates a shortened strip 14a on the right being connected to the full strip 14 on the left. The full strip is already in position and tongue 126 of the shortened strip is positioned over groove 100 of the full strip. Protrusion 128 is aligned with notch 104 and then the shortened strip can be hammered downwardly until the top edges of the strips are in alignment, protrusion 128 is engaged with notch 104, and tongue 126 is locked underneath the top edge of the full strip.

Figure 16:
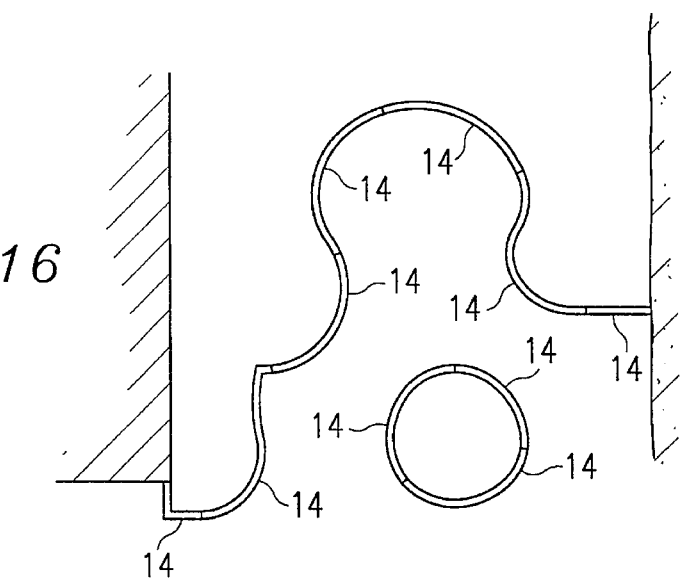
FIG. 16 is a plan view of an example of a layout of the strips of the present invention connected together.

FIG. 16 illustrates an example of a lawn edging layout including a right angle, curved strips, shortened strips and a tree ring. This layout takes advantage of the versatile features of living hinges 114 and 116, the ability of the strip to be shortened while still capable of being connected to another strip and the overall flexibility of the strip along its entire length.

Figure 18:
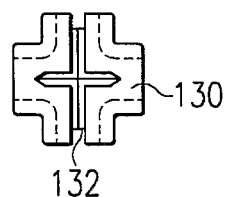
FIG. 18 is a top view of the extension piece in FIG. 17.
Figure 17:
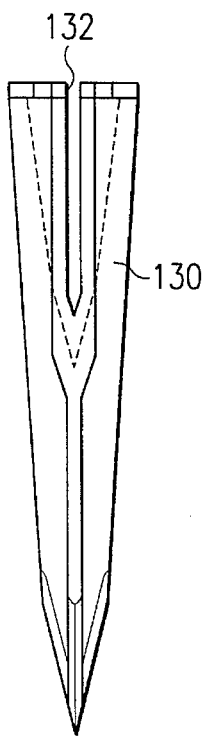
FIG. 17 is a side view of the further embodiment of an extension piece for use with the strip of the present invention.

FIGS. 17 and 18 illustrate an alternative embodiment of the present invention comprising separate extension pieces 130 which have a top end with crossed grooves 132 which are dimensioned to receive the cross-shaped cross-section of the stake-like portion of strip 14 defined by apex 38, first rib 60 and second rib 80.

Figure 19:
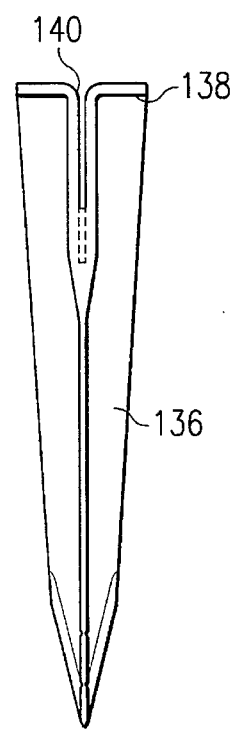
FIG. 19 is a front view of the further embodiment of a stake for use with the strip of the present invention.
Figure 20:
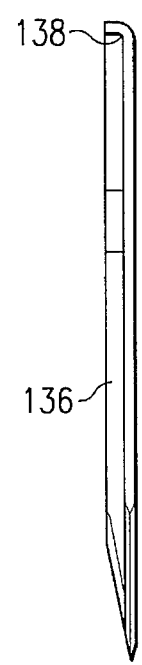
FIG. 20 is a side view of the stake of FIG. 19.

FIGS. 19 and 20 illustrate a further embodiment comprising separate stakes 136 which have top end 138 with slot 140 that is dimensioned to receive a top support rib 90 such that top end 138 will abut underneath first underside 46 of flange 42 of top edge 18. Stakes 136 can also be used on second face 32 of strip 14 to facilitate curving of strip 14 such that second face 32 is on the outside of the curve. In this situation, slots 140 of stakes 136 can be positioned over a second rib 80 near an end of the strip to firmly engage strip 14 and maintain the curve. Preferably, stakes 136 are plastic stakes with a rib for support. However, because stakes 136 should be underneath top edge 18 if used with a top support rib 90 or below ground level with a second rib 80, the stakes can be made from stamped metal and not pose a safety risk.

The further embodiments of FIGS. 17–20 are useful when the area in which the edging is to be used has loose material such as mulch or peat moss that will not hold a curve of a strip 14. Extension pieces 130 and/or stakes 136 can then be used to reach firmer ground beneath the loose material so a curve of the strip can be maintained.

To install the lawn edging of the present invention, the desired layout of the edging should first be planned so it can be determined if any strips will need to be shortened to make up the desired layout. The second face with the smooth surface zone 86 should face the grass. The first strip inserted should be the strip that will not need a connection to its tongue end. Then, the strips can be connected and inserted one at a time by connecting the tongue of the next strip into the groove of the previously inserted strip until the layout is complete. For each strip, the top surface of the flange of the top edge is hammered along its length to work the lawn edging into the ground.

Although the present invention has been described with respect to a preferred embodiment, various changes, substitutions and modifications of this invention may be suggested to one skilled in the art, and it is intended that the present invention encompass such changes, substitutions and modifications as fall within the scope of the appended claims.

We claim:

1. A lawn edging strip adapted for forced insertion into the ground, comprising:
   (a) a flexible strip having a height defined between a top edge and a bottom edge, a length defined from a first end to a second end, and a thickness defined between a first face and a second face;
   (b) the bottom edge of the strip configured to allow forced insertion of the bottom edge into the ground, and the top edge of the strip configured to withstand hammering and comprising a flange that extends perpendicular from the first face of the strip, the flange being defined by a top surface, a first underside and a first edge, the first edge being contoured to allow for flexibility of the strip horizontally; and
   (c) a first plurality of generally parallel ribs spaced along and extending from the first face of the flexible strip, the first ribs being oriented generally perpendicular to the length of the strip, each of the first ribs having a bottom end and a top end opposite thereto.

2. The edging strip of claim 1 wherein the bottom edge is of a contour comprising a series of arches with a corresponding series of apexes between each of the arches.

3. The edging strip of claim 2 wherein each of the plurality of first ribs is aligned with one of the plurality of apexes.

4. The edging strip of claim 3 further comprising extension pieces having a top end with grooves dimensioned to frictionally receive the apex and the bottom end of one of the first plurality of first ribs, the extension pieces tapering away from the top end.

5. The edging strip of claim 1 wherein the flange also extends perpendicularly from the second face, the flange being further defined by a second underside and a second edge.

6. The edging strip of claim 5 wherein the first edge of the flange is contoured in generally a scalloped shape to allow for flexibility of the strip horizontally.

7. The edging strip of claim 1 wherein each of the plurality of ribs has a top end that is connected to the flange and that extends perpendicular to the first face of the strip approximately the same distance as the flange, each of the first plurality of ribs having a height that tapers from the top end of the rib towards the bottom edge.

8. The edging of claim 1 further comprising a second plurality of ribs extending from the second face of the strip, the second ribs being spaced generally parallel to each other and oriented generally perpendicular to the length of the strip, the second ribs having a bottom end towards the bottom edge and a top end towards the top edge of the strip.

9. The edging strip of claim 8 wherein the second plurality of ribs is aligned with the series of apexes of the bottom edge.

10. The edging strip of claim 9 further comprising extension pieces having a top end with grooves dimensioned to frictionally receive the apex and the bottom ends of one of the first plurality ribs and one of the second plurality of ribs, the extension pieces tapering away from the top end.

11. The edging strip of claim 8 wherein the top end of the second ribs is spaced from the top edge of the strip to provide a smooth surface zone along the upper portion of the second face of the strip.

12. The edging strip of claim 4 further comprising a plurality of top support ribs extending between the first underside of the flange and the first face of the strip to increase the ability of the strip to resist deflection from hammering.

13. The edging strip of claim 1 wherein the first end comprises a tongue extending in the same plane as the strip and having a height less than the general height of the strip, and wherein the second end has two wall pieces which define a groove therebetween that is dimensioned to receive a tongue from another strip.

14. The edging strip of claim 13 wherein the tongue further comprises a protrusion, and wherein a notch is defined in one of the wall pieces, the protrusion and notch dimensioned for engagement, and wherein the tongue and groove are oriented such that the tongue can be inserted into the groove in a direction perpendicular to the length of the strip.

15. The edging strip of claim 14 wherein the strip further comprises a plurality of top support ribs spaced along the first face of the strip and extending perpendicular from the first face and between the first underside of the flange and the first face of the strip, each of the plurality of top support ribs dimensioned such that the strip can be cut around a portion of any top rib to create a tongue and a second protrusion ready for insertion in a groove and a notch of a second end of another strip.

16. The edging strip of claim 13 wherein one of the wall pieces is the first face of the strip at the second end and the other wall piece is a flap connected along its bottom side to the first face, and wherein the groove is defined between the flap and the first face.

17. The edging strip of claim 16 wherein the tongue comprises a protrusion and a correspondingly dimensioned notch is defined in the flap for engagement with the protrusion.

18. The edging strip of claim 1 further comprising first living hinge spaced from the first end of the strip and extending from the top edge to the bottom edge such that the first end of the strip can be turned at an angle in at least one direction with respect to the remainder of the strip.

19. The edging strip of claim 18 further comprising a second living hinge spaced from the second end of the strip and extending from the top edge to the bottom edge such that the second end can be turned at an angle to the remainder of the strip.

20. A lawn edging strip for insertion into the ground, comprising:
   (a) a flexible strip having a height defined between a top edge and a bottom edge, a length defined from a first end to a second end, and a thickness defined between a first face and a second face;
   (b) the bottom edge of the strip configured to allow forced insertion of the bottom edge into the ground, and the top edge of the strip configured to withstand hammering;
   (c) the first end comprising a tongue extending in the same plane as the strip and having a height less than the general height of the strip; and
   (d) the second end comprising two wall pieces which define a groove therebetween that is dimensioned to receive a tongue from another strip, one of the wall pieces being the first face of the strip at the second end and the other wall piece being a flap connected along its bottom side to the first face, and wherein the groove is defined between the flap and the first face.

21. The edging strip of claim 20 wherein the tongue further comprises a protrusion, and wherein a notch is defined in one of the wall pieces, the protrusion and notch dimensioned for engagement, and wherein the tongue and groove are oriented such that the tongue can be inserted into the groove in a direction perpendicular to the length of the strip.

22. The edging strip of claim 20 wherein the tongue comprises a protrusion and a correspondingly dimensioned notch is defined in the flap for engagement with the protrusion.

23. The edging strip of claim 20 further comprising a living hinge spaced from one of the ends of the strip and extending from the top edge to the bottom edge such that the one end can be turned at an angle to the remainder of the strip.

24. The edging strip of claim 20 wherein the strip further comprises a plurality Of top support ribs spaced along the first face of the strip and extending perpendicular to the length of the strip, each of the plurality of top support ribs dimensioned such that the strip can be cut around a portion of any top rib to create a second tongue and a second protrusion ready for insertion in a groove and a notch of a second end of another strip.

25. A lawn edging strip adapted for forced insertion into the ground, comprising:
   (a) a flexible strip having a height defined between a top edge and a bottom edge, a length defined from a first end to a second end, and a thickness defined between a first face and a second face;
   (b) the bottom edge of the strip configured to allow forced insertion of the bottom edge into the ground, and the top edge of the strip configured to withstand hammering;
   (c) a first plurality of generally parallel ribs spaced along and extending from the first face of the planar strip, the first ribs being oriented generally perpendicular to the length of the strip, each of the first ribs having a bottom end and a top end opposite thereto;
   (d) a second plurality of ribs extending from the second face of the strip, the second ribs being spaced generally parallel to each other and oriented generally perpendicular to the length of the strip, the second ribs having a bottom end and a top end, the top end of the second ribs is spaced from the top edge of the strip to provide a smooth surface zone along the upper portion of the second face of the strip.

26. A lawn edging strip for insertion into the ground, comprising:
   (a) a flexible strip having a height defined between a top edge and a bottom edge, a length defined from a first end to a second end, and a thickness defined between a first face and a second face;
   (b) the bottom edge of the strip configured to allow forced insertion of the bottom edge into the ground, and the top edge of the strip configured to withstand hammering;
   (c) the first end comprising a tongue extending in the same plane as the strip and having a height less than the general height of the strip;
   (d) the second end comprising two wall pieces which define a groove therebetween that is dimensioned to receive a tongue from another strip; and
   (e) a plurality of top support ribs spaced along the first face of the strip and extending perpendicular to the length of the strip, each of the plurality of top support ribs dimensioned such that the strip can be cut around a portion of any top rib to create a second tongue and a second protrusion ready for insertion in a groove and a notch of a second end of another strip.

* * * * *